(12) United States Patent
Singhal

(10) Patent No.: US 12,487,814 B2
(45) Date of Patent: Dec. 2, 2025

(54) TELECOM MICROSERVICE ROLLING UPGRADES

(71) Applicant: Parallel Wireless, Inc., Nashua, NH (US)

(72) Inventor: Mukesh Singhal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 322 days.

(21) Appl. No.: 18/155,732

(22) Filed: Jan. 17, 2023

(65) Prior Publication Data

US 2023/0229428 A1    Jul. 20, 2023

Related U.S. Application Data

(60) Provisional application No. 63/300,106, filed on Jan. 17, 2022.

(51) Int. Cl.
*G06F 8/656* (2018.01)
(52) U.S. Cl.
CPC .................. *G06F 8/656* (2018.02)
(58) Field of Classification Search
CPC .................. G06F 8/656; G06F 8/65
See application file for complete search history.

(56) References Cited

U.S. PATENT DOCUMENTS

| 2007/0146542 A1* | 6/2007 | Strasser | H04N 21/4181 |
| | | | 348/E5.004 |
| 2019/0379953 A1* | 12/2019 | Yuang | H04J 14/0267 |
| 2022/0132066 A1* | 4/2022 | Ma | H04N 25/46 |
| 2023/0205752 A1* | 6/2023 | Singhal | G06F 9/4881 |
| | | | 707/812 |
| 2023/0208704 A1* | 6/2023 | Singhal | H04L 41/40 |
| | | | 709/224 |

OTHER PUBLICATIONS

"Performing a Rolling Update", https://kubernetes.io/docs/tutorials/kubernetes-basics/update/update-intro/ Feb. 4, 2020.

* cited by examiner

*Primary Examiner* — Michael A Keller
(74) *Attorney, Agent, or Firm* — Michael Y. Saji

(57) ABSTRACT

A method is disclosed for providing a telecom microservice rolling upgrade, the method comprising: providing, by a Service Management and Orchestration (SMO), a new instance of F1 demux in a same cluster and namespace; advertising the new instance of the F1 demux to all PODs and micro services; informing, by the SMO, an old F1 demux to start a version upgrade to a new instance; sending, by the old F1 demux, a trigger to start a reconcile procedure to a new F1 demux; advertising that the old instance of the F1 demux is not available to take up new calls from internal PODs and micro-service, and is accepting traffic via the new F1 demux only; routing, by the old F1 demux, all incoming F1 traffic from a Distributed Unit (DU) to the new F1 demux; and instructing the DU, by the old F1 demux, to add a Transport Network Layer (TNL) association of the new F1 demux.

1 Claim, 9 Drawing Sheets

TELECOM MICROSERVICE ROLLING UPGRADES

CROSS-REFERENCE TO RELATED APPLICATIONS

The present application is a non-provisional conversion of, and claims priority under 35 U.S.C. § 119(e) to, U.S. Provisional Pat. App. No. 63/300,106, filed Jan. 17, 2022 with the same title as the present application, and which is also hereby incorporated by reference in its entirety for all purposes. The present application also hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The 3GPP 5G RAN architecture and known as NG-RAN, introduces new interfaces and functional modules. The NG-RAN consists of a set of radio base stations i.e. gNBs which is connected to 5GC (5G core network). The gNB has three main functional modules: the Centralized Unit (gNB-CU), the Distributed Unit (gNB-DU) and the Radio Unit (RU).

SUMMARY

Figure 1:
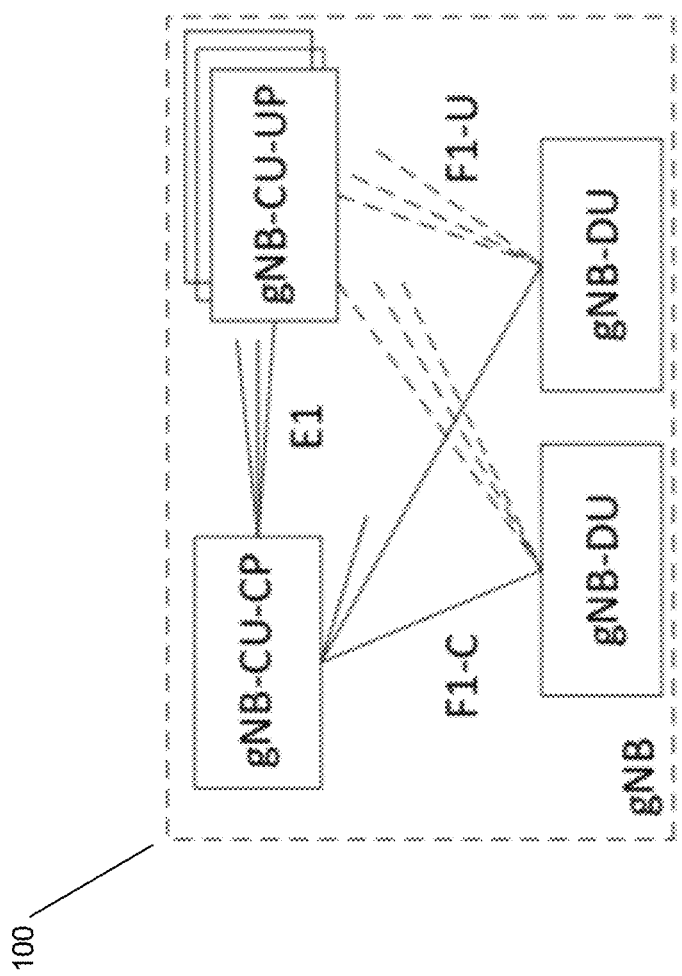
FIG. 1 is a schematic diagram of a gNodeB in communication with a microservices-based 5G core network, in accordance with some embodiments.

This invention provides telecom microservice rolling upgrades. gNB-DU & gNB-CU-CP interface protocol is F1-APP. Task/Micro-service in CU-CP handles F1 interface procedure exposed to gNB-DU is named as "F1 Demux or F1-APP demux". The presently described method and system provides a seamless software upgrade of "F1-Demux" during 5G live signaling.

In one embodiment, a method of providing a telecom microservice rolling upgrade is disclosed. The method includes providing, by a Service Management and Orchestration (SMO), a new instance of F1 demux in a same cluster and namespace; advertising the new instance of the F1 demux to all PODs and micro services; informing, by the SMO, an old F1 demux to start a version upgrade to a new instance; sending, by the old F1 demux, a trigger to start a reconcile procedure to a new F1 demux; advertising that the old instance of the F1 demux is not available to take up new calls from internal PODs and micro-service, and is accepting traffic via the new F1 demux only; routing, by the old F1 demux, all incoming F1 traffic from a Distributed Unit (DU) to the new F1 demux; and instructing the DU, by the old F1 demux, to add a Transport Network Layer (TNL) association of the new F1 demux.

DETAILED DESCRIPTION

In a cloud distributed architecture, pod & services life is transient. IP address of pods for internal communication are dynamically allocated at pod bring up. Number of pods vary based on load conditions in network. pods and service bring up sequence is dependent on of orchestrator and cloud resources. There is lot of dynamism in cloud deployments.

A product/service may be made up of multiple distinct microservices, pods and multiple interfaces to outside world. All the pods and micro services combined together provides some network function to outside world. It is desirable to identify set of pods and microservices available in given deployment dynamically.

Multiple services and worker pods stitched together to provide common function, may not be known to cloud providers. Load balancer microservices available today are very limited to few protocols only. Not all protocol are stateless, hence dynamic changes in internal environment are desired to be discovered and advertised in a matter of few milliseconds.

In Kubernetes, a Pod (as in a pod of whales or pea pod) is a group of one or more containers, with shared storage and network resources, and a specification for how to run the containers. A Pod's contents may be co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods get their own IP and services get a cluster IP. Cluster IP is internal only. Kubernetes creates a cluster when a pod is created. Kubernetes supports a method for tracking which pods are available and/or down. It tracks which ones are live and which ones are down. While Kubernetes is described herein, other container management and orchestration methods are understood to be supported in the spirit of the present disclosure.

Pods are configured in Kubernetes using YAML files. A controller for the resource handles replication and rollout and automatic healing in case of Pod failure. For example, if a Node fails, a controller notices that Pods on that Node have stopped working and creates a replacement Pod. The scheduler places the replacement Pod onto a healthy Node.

In the present disclosure, a pod is a group of one or more containers, which may have shared storage and network resources, and which may also have a specification for how to run the containers. A pod's contents may be co-located and co-scheduled, and run in a shared context. A pod may be an application-specific logical host, or may be non-application specific. In some embodiments, applications may be executed on different or the same physical or virtual machine. In some embodiments, applications may be cloud applications executed on the same logical host, or executed at a different location. Where pods and/or containers are described herein, various alternatives are also considered, such as Linux containers, Kubernetes containers, Microsoft Azure, or other cloud-based software technologies.

It is typical for multiple microservices and multiple types of pod combined together forming a single product deployment. Each inbound interface is handled by a microservice, for example, the E1 interface with CU-UP is handled by a E1-AP demux/microservice, and the NG interface with AMF+SMF is handled by an NGAP demux/microservice, and so on. Microservices being brought up and taken down in this way are able to handle demands flexibly and quickly, and react in a matter of milliseconds. The microservices shown are located inside the logical boundary of the pod.

In some embodiments, an internal controller keeps track of health of some or all pods & micro services in a given namespace. As soon as any pod/container crashes, it updates the remaining pods. And takes necessary steps to bring system in workable state.

In some embodiments, a database (Service registry) may act as service registry database for some or all pods and micro-service in given namespace. All the pods on start-up can update required information in database & fetch required information from service registry database.

In cloud deployment, software upgrade is supported via exposing IP of load balancer & multiple backend stateless pod. Load balancer routes the traffic based on some limited option to these backend pods.

There is no existing load balancer to do the F1-APP protocol for load balancing across multiple backend pods efficiently. Moreover, this model is not efficient as it requires more CPU/RAM resources as well as adds latency for control plane signaling.

F1-APP demux exposes a public IP to gNB-DU via SMO or pre-configured in gNB-DU. Software upgrade for heterogenous services model is complex.

The gNB-CU is disaggregated into CU control plane (CU-CP) and CU data plane (CU-UP). gNB overall architecture.

Abbreviations

CU-CP (central unit control plane): This node handles RRC and the control plane part of the PDCP protocol. This node communicates with DU over F1-C interface and with CU-UP over E1 interface as defined in 3GPP specifications.

CU-UP/s (central unit user plane): This node handles user plane part of PDCP protocol and SDAP protocol. It communicates with CU-CP over E1 interface and with DU over F1-U interface.

SMO (Service management and orchestration): Control of infrastructure components like CPU/Memory and scale up and scale down operations; FCAPS (Fault, Configuration, Security, Performance, Accounting) management of Open-RAN elements (gNB-CU-CP, gNB-CU-UP, gNB-DU).

AMF/SMF (access and mobility management function, session management function): 3GPP defined 5G core network element for control signaling.

UPF (user plane function): 3GPP defined 5G core network element for data-plane traffic.

DU (gNB-DU) (distributed unit): 3GPP defined 5G access network element.

F1-Demux: Internal Micro-service in CU-CP cluster to handle F1-APP interface signaling with gNB-DU. F1-APP interface terminates at F1-Demux. F1-Demux exposes at least 1 public IP to gNB-DU to communicate. It hides internal topology of signaling within CU-CP.

DB (database): In memory key-value pair database. All micro-service in single deployment will share common database to synchronize information across pods or microservice. DB act as central entity in deployment. DB has its own distribution model.

FIG. 1 is a schematic diagram of a gNodeB in communication with a microservices-based 5G core network, in accordance with some embodiments. 100 shows two gNodeBs, each in communication with the CU-CP and CU-UP. There is one CU-CP shown and multiple CU-UPs, as needed for handling user traffic. The interface used for communication between the gNB-DUs and the CU units is the F1 interface (F1-C for gNB-CU-CP and F1-U for gNB-CU-UP). The gNB-CU-CP and gNB-CU-UP communicate via the E1 protocol. The protocols operate using connections between the nodes; there are a plurality of gNB-CU-UP nodes and each node has its own connection to the gNB-DU, in some embodiments. The nodes may be microservices or pods, in some embodiments, such that each additional gNB-CU-UP may be a pod.

Figure 2:
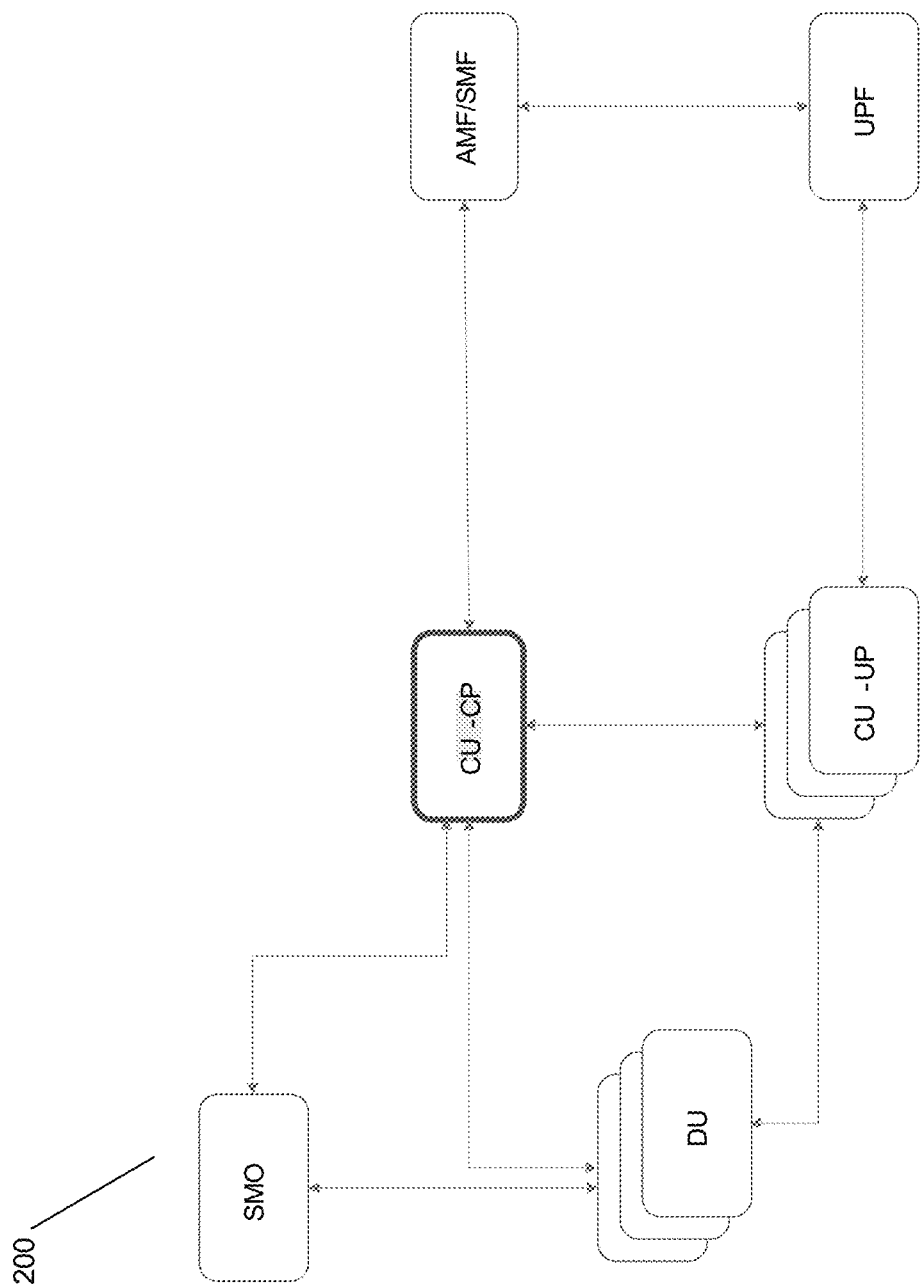
FIG. 2 is a schematic diagram of a microservices-based network, in accordance with some embodiments.

FIG. 2 is a schematic diagram 200 of a microservices-based network, in accordance with some embodiments. The CU-CP and CU-UP from FIG. 1 are shown, including the plurality of CU-UP nodes, wherein the plurality may be any number as needed for handling user traffic. In addition, AMF/SMF, SMO, UPF nodes are also shown and their communication paths with CU-CP and CU-UP and with each other are shown. In addition, a plurality of DUs are shown. The plurality of DUs may be gNodeBs, in some embodiments. Each node shown may be a microservice or pod, in some embodiments.

Figure 3:
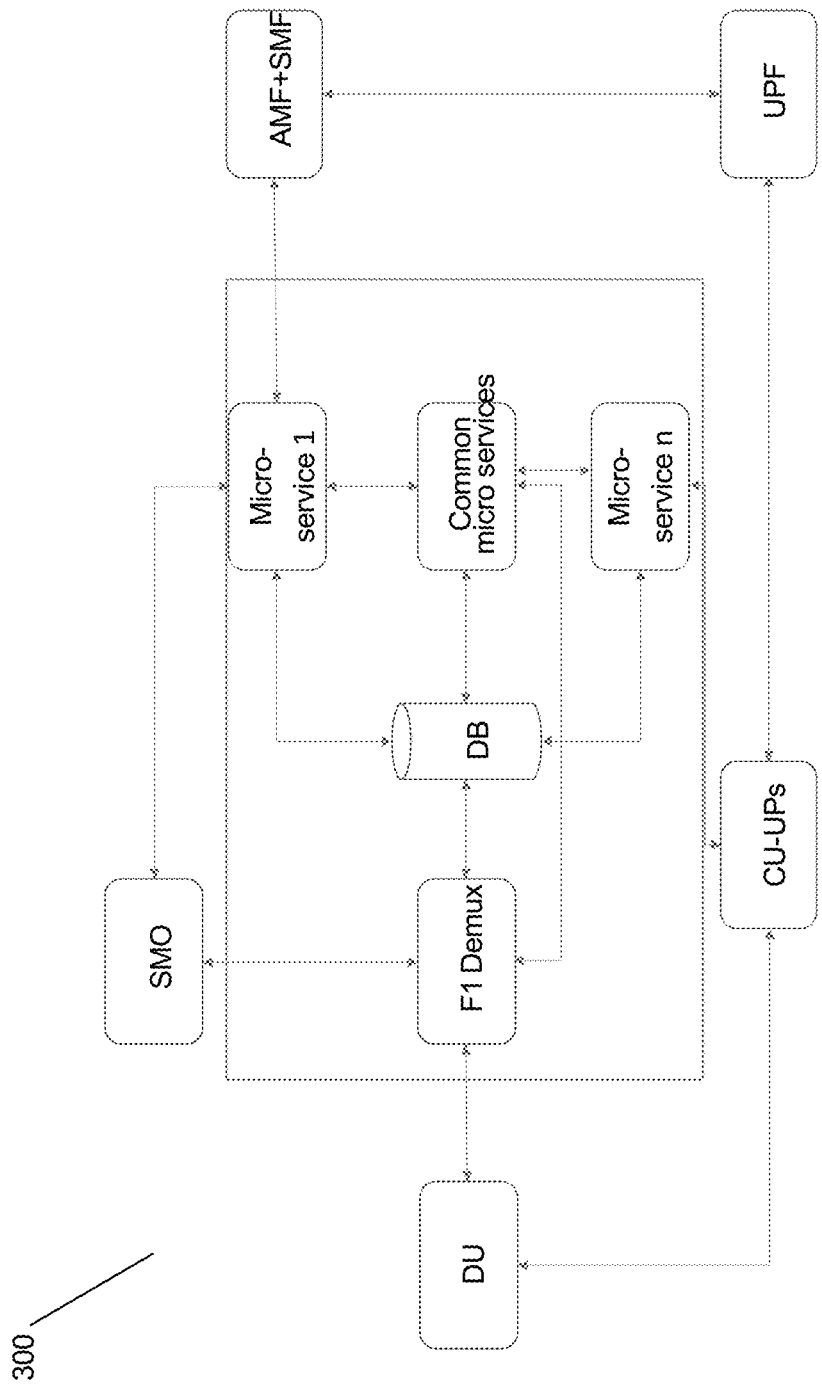
FIG. 3 is a detailed schematic diagram of a microservices-based network, in accordance with some embodiments.

FIG. 3 is a detailed schematic diagram 300 of a microservices-based network, in accordance with some embodiments. The CU-CP is shown in an exploded view. The CU-CP is shown to include F1 demux, a database that is local to the CU-CP, a selection of common microservices, and a plurality of additional microservices as needed to handle CU-CP services. Each microservice may be a pod. A coordination service may be provided to spin up these services together. Each CU-CP may include each of these microservices. FIG. 3 shows the need for an F1 demux to receive traffic from one or more DUs and redirect/demultiplex/demux the traffic from the one or more DUs to, as needed, the SMO or to microservices within the CU-CP that handle CU-CP functions.

Figure 4:
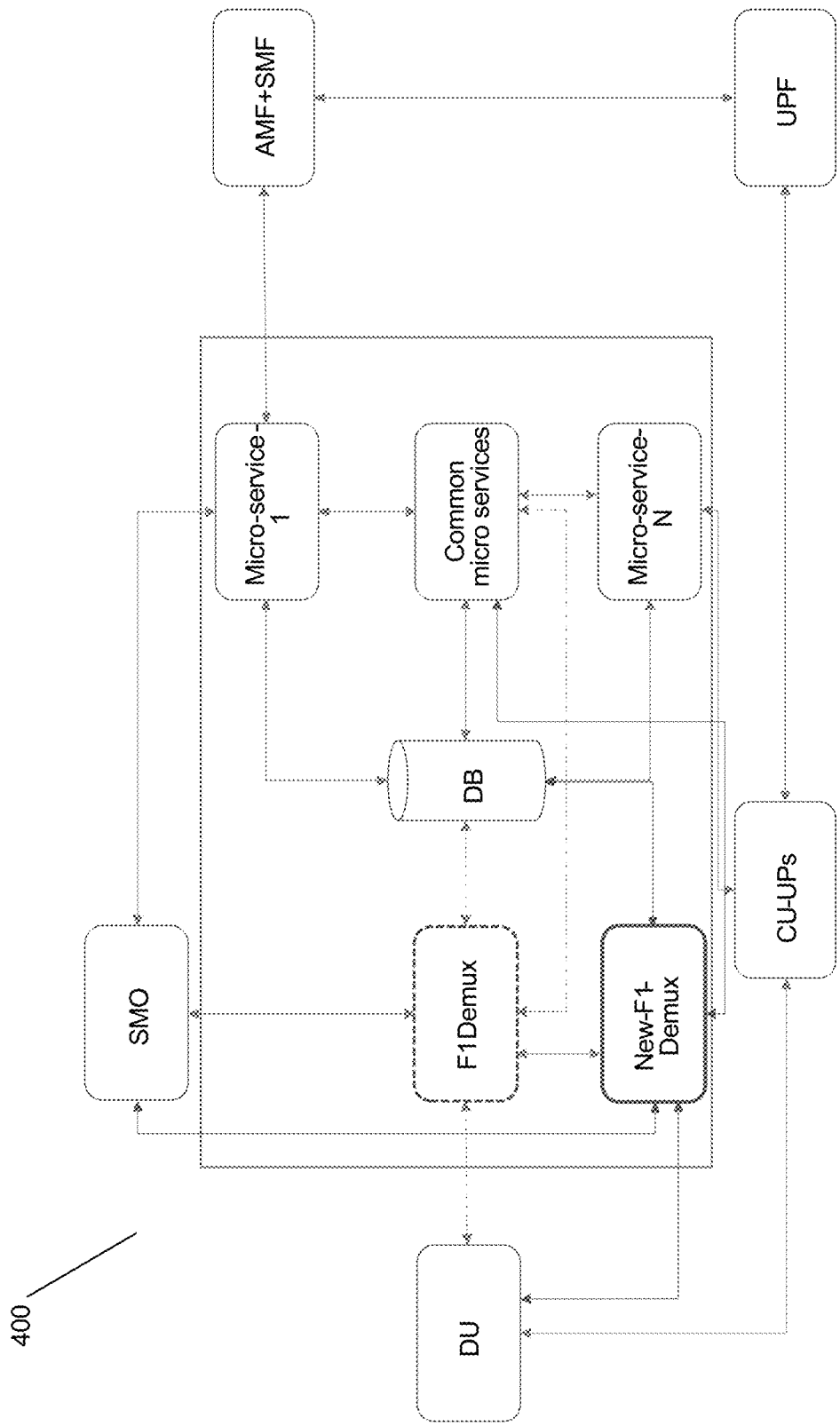
FIG. 4 is a further detailed schematic diagram of a microservices-based network, in accordance with some embodiments.

FIG. 4 is a further detailed schematic diagram of a microservices-based network, in accordance with some embodiments. FIG. 4 shows a logical internal architecture of CU-CP with New-F1 demux instantiated by SMO. SMO will create "New F1 Demux" instance which is a microservice with public IP exposed to gNB-DU for 5G control plane F1-APP signaling. A new F1 demux is shown; the discussion follows regarding provisioning the new F1 demux and decommissioning the old F1 demux.

Since software upgrades are always admin/operator triggered activity. Operator/Admin can launch new instance of F1-APP demux within same cluster and using same CU-CP name and namespace.

F1-APP demux will have new public IP reachable from gNB-DUs. 3GPP Specification provides mechanism to add new TNL association and F1 connection between gNB-DU and gNB-CU-CP.

F1-APP new demux inform internal pods/micro-service about availability of new instance. All internal traffic destined to old-F1 demux should be sent to new-F1-demux.

Old demux should send incoming traffic from gNB-DU to new-F1-Demux instance, which will process it and take required action.

Old F1 demux initiate procedure with DU to add new TNL & F1 connection with "New-F1-Demux".

DU establish TNL & F1 connection with New-F1-Demux. "New F1-demux" initiate procedure to remove "Old F1 Demux" association with DU. DU remove old association with "Old F1 Demux"

New F1 demux has complete control of messaging with gNB-DU.

Old F1 demux informs SMO of completion of version upgrade. SMO destroy "Old F1 demux" instance.

Figure 5A:
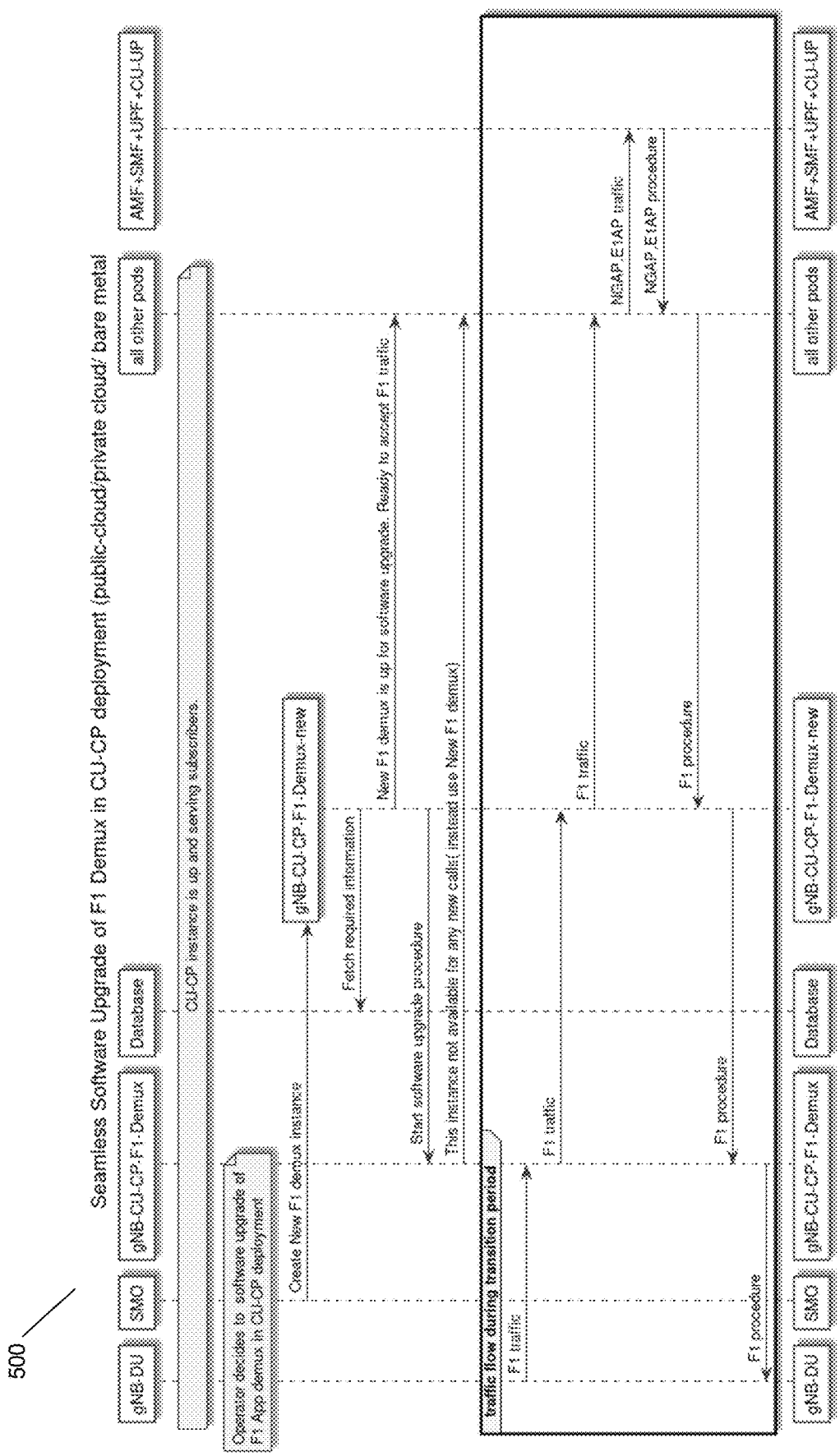
FIGS. 5A and 5B are a flow diagram showing communications in a software upgrade process, in accordance with some embodiments.
Figure 5B:
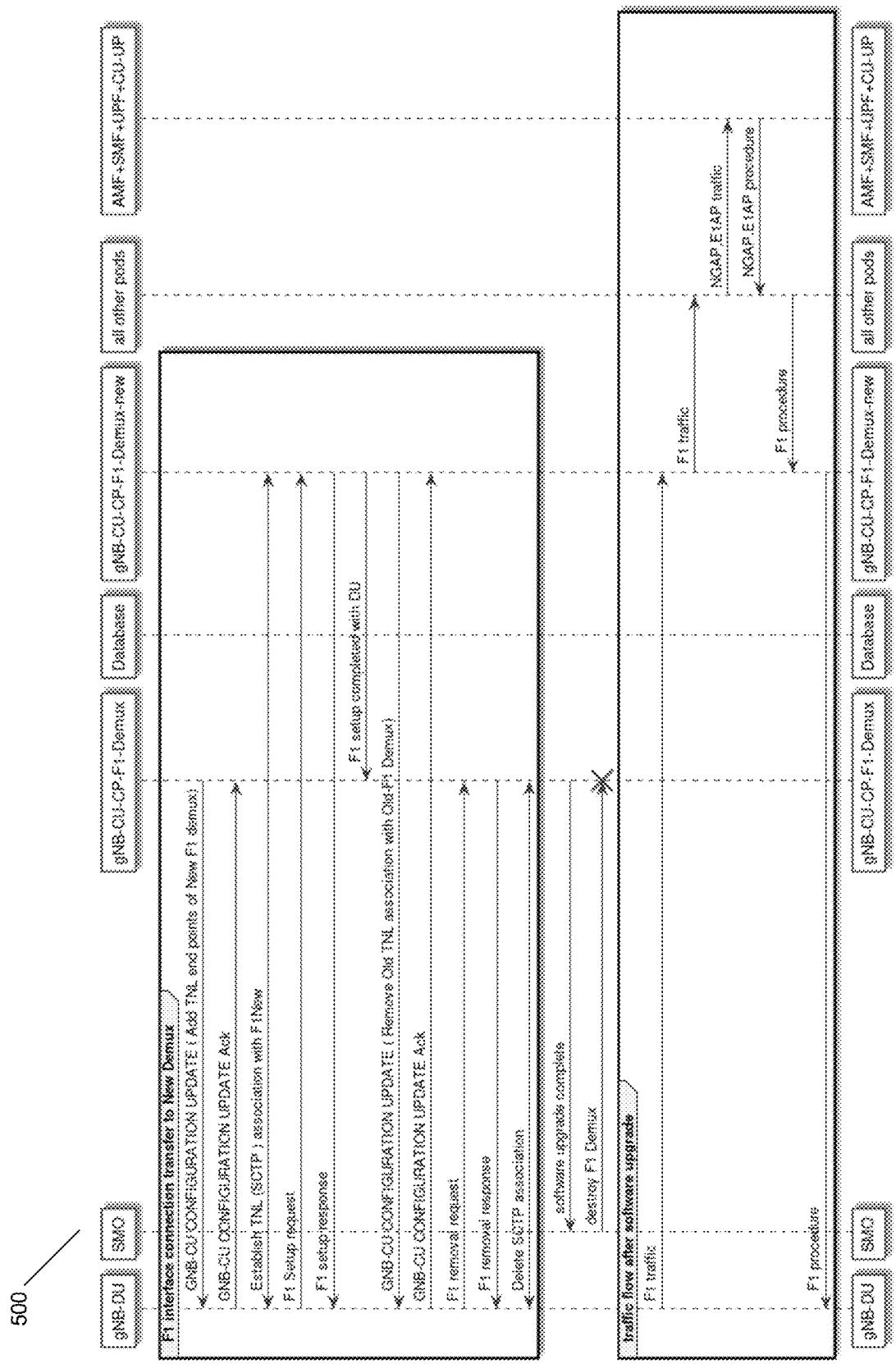

FIGS. 5A and 5B are a flow diagram showing communications in a software upgrade process, in accordance with some embodiments, F1-APP demux software upgrade callflow, as shown in FIGS. 5A and 5B:

SMO creates new instance of F1 demux in same cluster and namespace. Advertise New instance of F1 demux to all PODs and micro services. SMO informs old F1 demux to start version upgrade to new instance. Old F1 demux sends trigger to start reconcile procedure to New F1 demux; advertise Old instance of F1 demux is not available to take up new calls from internal PODs and micro-service (accept traffic via New F1 demux only); old F1 demux will route all incoming F1 traffic from DU to New F1 demux and old F1 demux instruct DU to add TNL association of new F1 demux.

DU—establish new TNL Association with new F1 demux. New F1 demux—until F1 interface is not up, route all F1 traffic to DU via old F1 demux manager; accept new TNL association with DU; wait for F1 setup procedure to complete. Once F1 setup is complete, Initiate procedure with DU to close old F1 demux association; an inform Old F1 demux to route all incoming/outgoing F1 traffic via new F1 demux.

Notably, no or minimal downtime is required as traffic is forwarded from the old F1 demux to the new F1 demux. As well, the new F1 demux is created within the CU-CP boundary and is transparent to users outside of the boundary, aside from the creation and deletion of SCTP associations as needed with gNB-DUs.

The described process may be repeated and may thus provide the capability for rolling upgrades, in some embodiments. It is understood that, while an F1 demux is shown for illustrative purposes, the same or similar techniques may be used for enabling software upgrades for other nodes.

Figure 6:
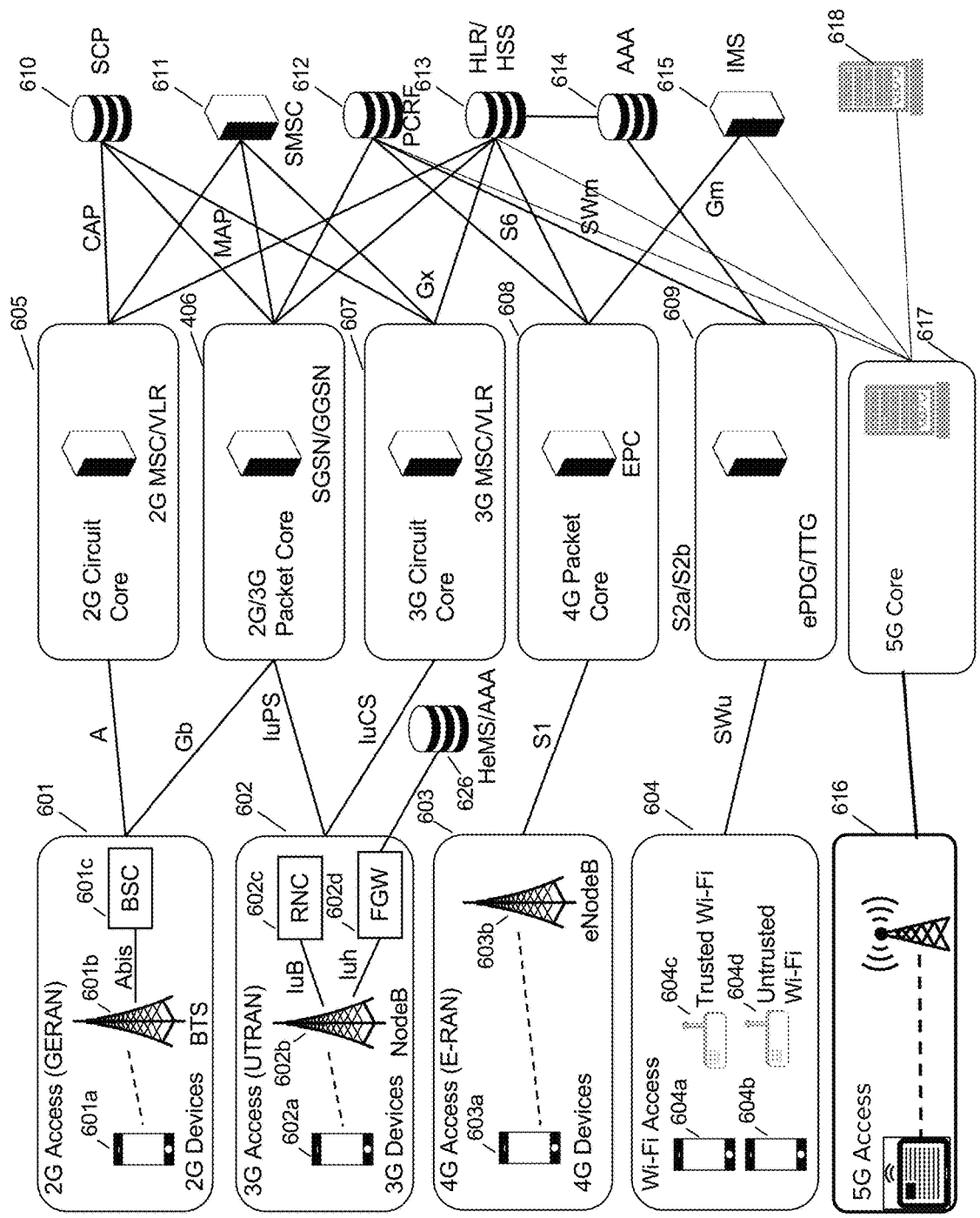
FIG. 6 is a schematic diagram of a multi-radio access technology (multi-RAT) deployment, in accordance with some embodiments.

FIG. 6 is a schematic diagram of a multi-radio access technology (multi-RAT) deployment, in accordance with some embodiments. The diagram shows a plurality of "Gs," including 2G, 3G, 4G, 5G and Wi-Fi. 2G is represented by GERAN 601, which includes a 2G device 601a, BTS 601b, and BSC 601c. 3G is represented by UTRAN 602, which includes a 3G UE 602a, nodeB 602b, RNC 602c, and femto gateway (FGW, which in 3GPP namespace is also known as a Home nodeB Gateway or HNBGW) 602d. 4G is represented by EUTRAN or E-RAN 603, which includes an LTE UE 603a and LTE eNodeB 603b. Wi-Fi is represented by Wi-Fi access network 604, which includes a trusted Wi-Fi access point 604c and an untrusted Wi-Fi access point 604d. The Wi-Fi devices 604a and 604b may access either AP 604c or 604d. In the current network architecture, each "G" has a core network. 2G circuit core network 605 includes a 2G MSC/VLR; 2G/3G packet core network 606 includes an SGSN/GGSN (for EDGE or UMTS packet traffic); 3G circuit core 607 includes a 3G MSC/VLR; 4G circuit core 608 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 630, the SMSC 631, PCRF 632, HLR/HSS 633, Authentication, Authorization, and Accounting server (AAA) 634, and IP Multimedia Subsystem (IMS) 635. An HeMS/AAA 636 is present in some cases for use by the 3G UTRAN. The diagram is used to indicate schematically the basic functions of each network as known to one of skill in the art, and is not intended to be exhaustive. For example, 5G core 617 is shown using a single interface to 5G access 616, although in some cases 5G access can be supported using dual connectivity or via a non-standalone deployment architecture.

Noteworthy is that the RANs 601, 602, 603, 604 and 636 rely on specialized core networks 605, 606, 607, 608, 609, 637 but share essential management databases 630, 631, 632, 633, 634, 635, 638. More specifically, for the 2G GERAN, a BSC 601c is required for Abis compatibility with BTS 601b, while for the 3G UTRAN, an RNC 602c is required for Iub compatibility and an FGW 602d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 7:
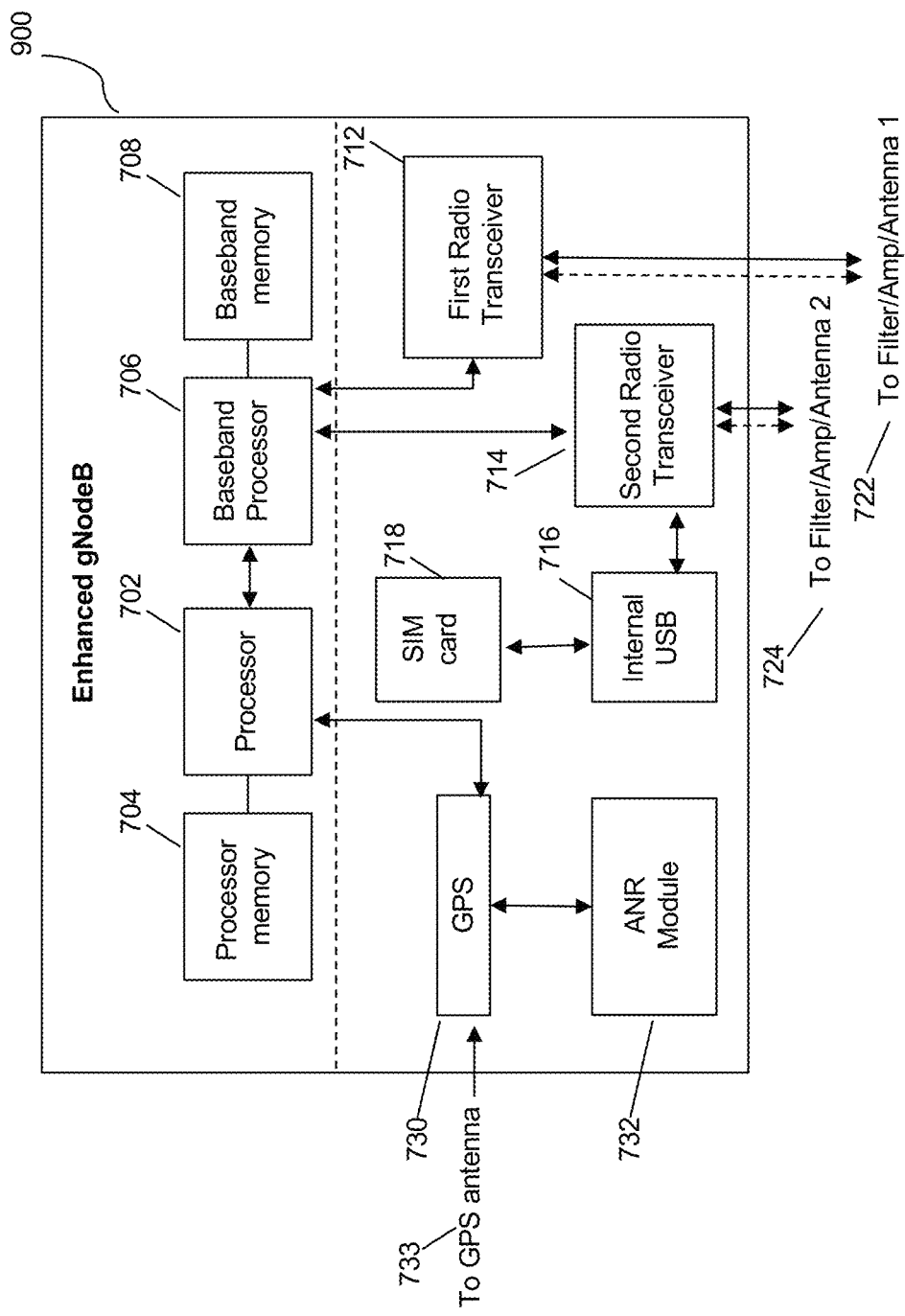
FIG. 7 is a schematic diagram of an enhanced base station, in accordance with some embodiments.

FIG. 7 is a schematic diagram of an enhanced base station, in accordance with some embodiments. gNodeB 700 may include processor 702, processor memory 704 in communication with the processor, baseband processor 706, and baseband processor memory 708 in communication with the baseband processor. Network node 700 may also include first radio transceiver 712 and second radio transceiver 714, internal universal serial bus (USB) port 716, and subscriber information module card (SIM card) 718 coupled to USB port 716. In some embodiments, the second radio transceiver 714 itself may be coupled to USB port 716, and communications from the baseband processor may be passed through USB port 716. The second radio transceiver may be used for wirelessly backhauling gNodeB 700. Or fiber may be used for fronthaul or backhaul.

Processor 702 and baseband processor 706 are in communication with one another. Processor 702 may perform routing functions, and may determine if/when a switch in network configuration is needed. Baseband processor 706 may generate and receive radio signals for both radio transceivers 712 and 714, based on instructions from processor 702. In some embodiments, processors 702 and 706 may be on the same physical logic board. In other embodiments, they may be on separate logic boards.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 712 and 714. Baseband processor 706 may use memory 708 to perform these tasks.

The first radio transceiver 712 may be a radio transceiver capable of providing 5G gNodeB functionality, and may be capable of higher power and multi-channel OFDMA. The second radio transceiver 714 may be a radio transceiver capable of providing 5G or UE functionality. Both transceivers 712 and 714 may be capable of receiving and transmitting on one or more bands. In some embodiments, either or both of transceivers 712 and 714 may be capable of providing both gNodeB and UE functionality. Transceiver 712 may be coupled to processor 702 via a Peripheral Component Interconnect-Express (PCI-E) bus, and/or via a daughtercard. As transceiver 714 is for providing UE functionality, in effect emulating a user equipment, it may be connected via the same or different PCI-E bus, or by a USB bus, and may also be coupled to SIM card 718. First transceiver 712 may be coupled to first radio frequency (RF) chain (filter, amplifier, antenna) 722, and second transceiver 714 may be coupled to second RF chain (filter, amplifier, antenna) 724.

SIM card 718 may provide information required for authenticating the simulated UE to the core network. When no access to an operator core is available, a local core may be used, or another local core on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target gNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 712 and 714, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 702 for reconfiguration.

A GPS module 730 may also be included, and may be in communication with a GPS antenna 732 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 732 may also be present and may run on processor 702 or on another processor, or may be located within another device, according to the methods and procedures described herein.

Other elements and/or modules may also be included, such as a home eNodeB gateway, a local gateway (LGW), a self-organizing network (SON) module, or another module. Additional radio amplifiers, radio transceivers and/or wired network connections may also be included.

Figure 8:
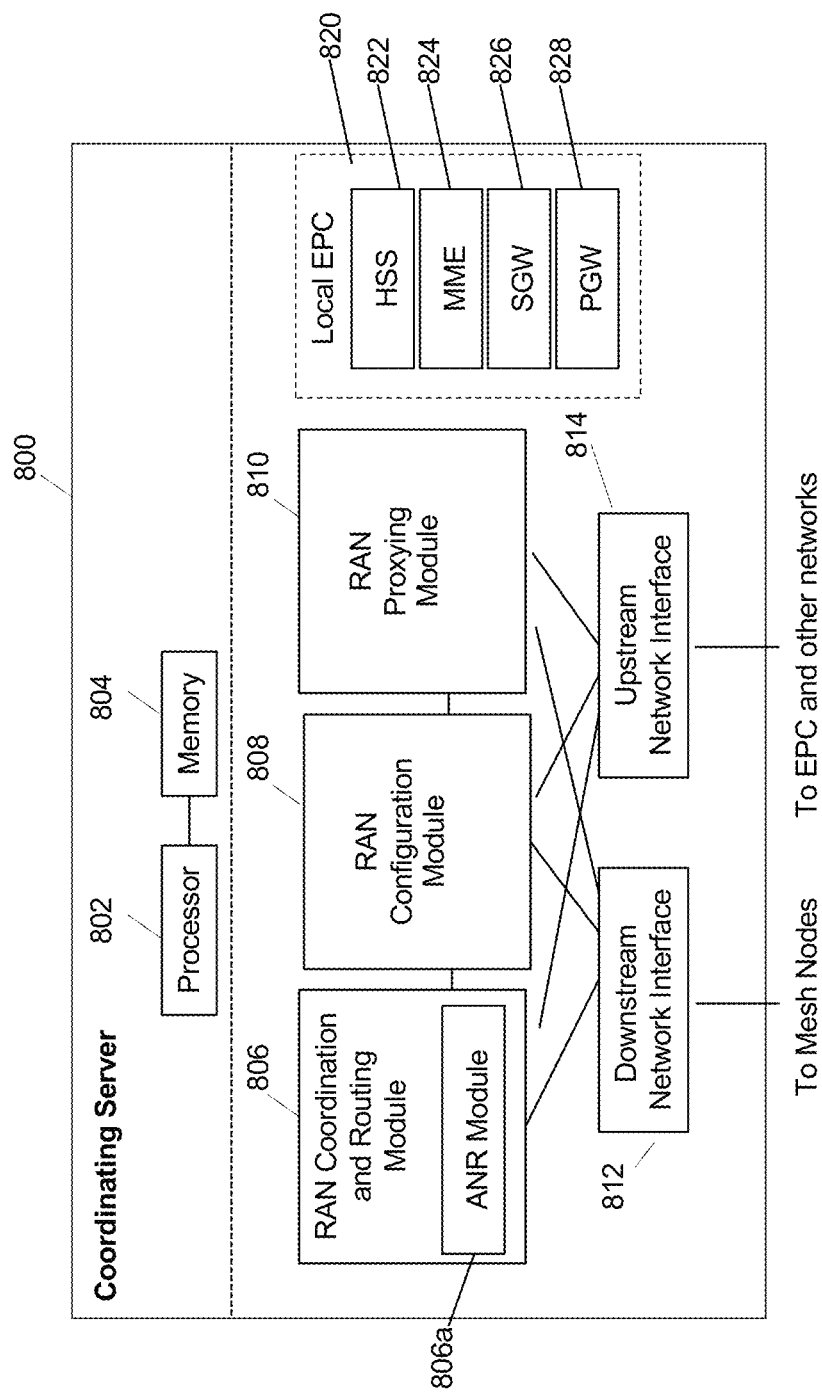
FIG. 8 is a schematic diagram of a coordinating server, in accordance with some embodiments.

FIG. 8 is a schematic diagram of a coordinating server, in accordance with some embodiments. Coordinating server 800 includes processor 802 and memory 804, which are configured to provide the functions described herein. Also present are radio access network coordination/routing (RAN Coordination and routing) module 806, including ANR module 806a, RAN configuration module 808, and RAN proxying module 810. The ANR module 806a may perform the ANR tracking, PCI disambiguation, ECGI requesting, and GPS coalescing and tracking as described herein, in coordination with RAN coordination module 806 (e.g., for requesting ECGIs, etc.). In some embodiments, coordinating server 800 may coordinate multiple RANs using coordination module 806. In some embodiments, coordination server may also provide proxying, routing virtualization and RAN virtualization, via modules 810 and 808. In some embodiments, a downstream network interface 812 is provided for interfacing with the RANs, which may be a radio interface (e.g., LTE or 5G), and an upstream network interface 814 is provided for interfacing with the core network, which may be either a radio interface (e.g., LTE or 5G) or a wired interface (e.g., Ethernet). Modules 806, 808, 810 and local core 820 may each run on processor 802 or on another processor, or may be located within another device.

In any of the scenarios described herein, where processing may be performed at the cell, the processing may also be performed in coordination with a cloud coordination server. A gNodeB may be in communication with the cloud coordination server via an X2 protocol connection, or another connection. The gNodeB may perform inter-cell coordination via the cloud communication server, when other cells are in communication with the cloud coordination server. The gNodeB may communicate with the cloud coordination server to determine whether the UE has the ability to support a handover to Wi-Fi or another RAT, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the 5G or Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MIME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MIME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing a telecom microservice rolling upgrade, the method comprising:
  providing, by a Service Management and Orchestration (SMO), a new instance of F1 demux in a same cluster and namespace;
  advertising the new instance of the F1 demux to all PODs and micro services;
  informing, by the SMO, an old F1 demux to start a version upgrade to a new instance;
  sending, by the old F1 demux, a trigger to start a reconcile procedure to a new F1 demux;
  advertising that the old instance of the F1 demux is not available to take up new calls from internal PODs and micro-service, and is accepting traffic via the new F1 demux only;
  routing, by the old F1 demux, all incoming F1 traffic from a Distributed Unit (DU) to the new F1 demux; and
  instructing the DU, by the old F1 demux, to add a Transport Network Layer (TNL) association of the new F1 demux.

* * * * *